(12) United States Patent
Hinds

(10) Patent No.: US 7,822,116 B2
(45) Date of Patent: Oct. 26, 2010

(54) METHOD AND SYSTEM FOR RATE ESTIMATION IN A VIDEO ENCODER

(75) Inventor: Raynard Hinds, Acton, MA (US)

(73) Assignee: Broadcom Corporation, Irvine, CA (US)

(*) Notice: Subject to any disclaimer, the term of this patent is extended or adjusted under 35 U.S.C. 154(b) by 1513 days.

(21) Appl. No.: 11/109,023

(22) Filed: Apr. 14, 2005

(65) Prior Publication Data

US 2006/0233238 A1    Oct. 19, 2006

(51) Int. Cl.
*H04N 7/12* (2006.01)

(52) U.S. Cl. ............. 375/240.03; 375/240; 375/240.01; 375/240.12

(58) Field of Classification Search ................ 375/240, 375/240.01, 240.02, 240.03, 240.04, 240.12
See application file for complete search history.

(56) References Cited

U.S. PATENT DOCUMENTS 5,926,222 A * 7/1999 Nickerson .............. 375/240.04
6,192,075 B1 * 2/2001 Jeng et al. .................. 375/240

* cited by examiner

*Primary Examiner*—Allen Wong
(74) *Attorney, Agent, or Firm*—McAndrews, Held & Malloy, Ltd.

(57) ABSTRACT

Described herein is a method and system for rate estimation in a video encoder. The method and system use estimation metrics that can also be part of motion estimation and spatial prediction. A rate controller may utilize the system for rate estimation in two ways. The rate controller may supply a quantization parameter and receive a bit estimate from the rate estimator. Alternatively, the rate controller may supply a bit estimate and receive a quantization parameter from the rate estimator.

28 Claims, 8 Drawing Sheets

METHOD AND SYSTEM FOR RATE ESTIMATION IN A VIDEO ENCODER

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video communications systems are continually being enhanced to meet requirements such as reduced cost, reduced size, improved quality of service, and increased data rate. Many advanced processing techniques can be specified in a video compression standard. Typically, the design of a compliant video encoder is not specified in the standard. Optimization of the communication system's requirements is dependent on the design of the video encoder. An important aspect of the encoder design is rate control.

The video encoding standard H.264 utilizes a combination of intra-coding and inter-coding. Intra-coding uses spatial prediction based on information that is contained in the picture itself. Inter-coding uses motion estimation and motion compensation based on previously encoded pictures.

For all methods of encoding, rate control can be important for maintaining a quality of service and satisfying a bandwidth requirement. Instantaneous rate, in terms of bits per frame, may change over time. An accurate up-to-date estimate of rate must be maintained in order to control the rate of frames that are to be encoded.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for rate estimation while encoding video data, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method for rate estimation in a video encoder are presented.

The invention can be applied to video data encoded with a wide variety of standards, one of which is H.264. An overview of H.264 will now be given. A description of an exemplary system for motion estimation in H.264 will also be given.

H.264 Video Coding Standard

The ITU-T Video Coding Experts Group (VCEG) and the ISO/IEC Moving Picture Experts Group (MPEG) drafted a video coding standard titled ITU-T Recommendation H.264 and ISO/IEC MPEG-4 Advanced Video Coding, which is incorporated herein by reference for all purposes. In the H.264 standard, video is encoded on a macroblock-by-macroblock basis. The generic term "picture" refers to frames and fields.

The specific algorithms used for video encoding and compression form a video-coding layer (VCL), and the protocol for transmitting the VCL is called the Network Access Layer (NAL). The H.264 standard allows a clean interface between the signal processing technology of the VCL and the transport-oriented mechanisms of the NAL, so source-based encoding is unnecessary in networks that may employ multiple standards.

By using the H.264 compression standard, video can be compressed while preserving image quality through a combination of spatial, temporal, and spectral compression techniques. To achieve a given Quality of Service (QoS) within a small data bandwidth, video compression systems exploit the redundancies in video sources to de-correlate spatial, temporal, and spectral sample dependencies. Statistical redundancies that remain embedded in the video stream are distinguished through higher order correlations via entropy coders. Advanced entropy coders can take advantage of context modeling to adapt to changes in the source and achieve better compaction.

An H.264 encoder can generate three types of coded pictures: Intra-coded (I), Predictive (P), and Bidirectional (B) pictures. Each macroblock in an I picture is encoded independently of other pictures based on a transformation, quantization, and entropy coding. I pictures are referenced during the encoding of other picture types and are coded with the least amount of compression. Each macroblock in a P picture includes motion compensation with respect to another picture. Each macroblock in a B picture is interpolated and uses two reference pictures. The picture type I uses the exploitation of spatial redundancies while types P and B use exploitations of both spatial and temporal redundancies. Typically, I pictures require more bits than P pictures, and P pictures require more bits than B pictures.

Figure 1:
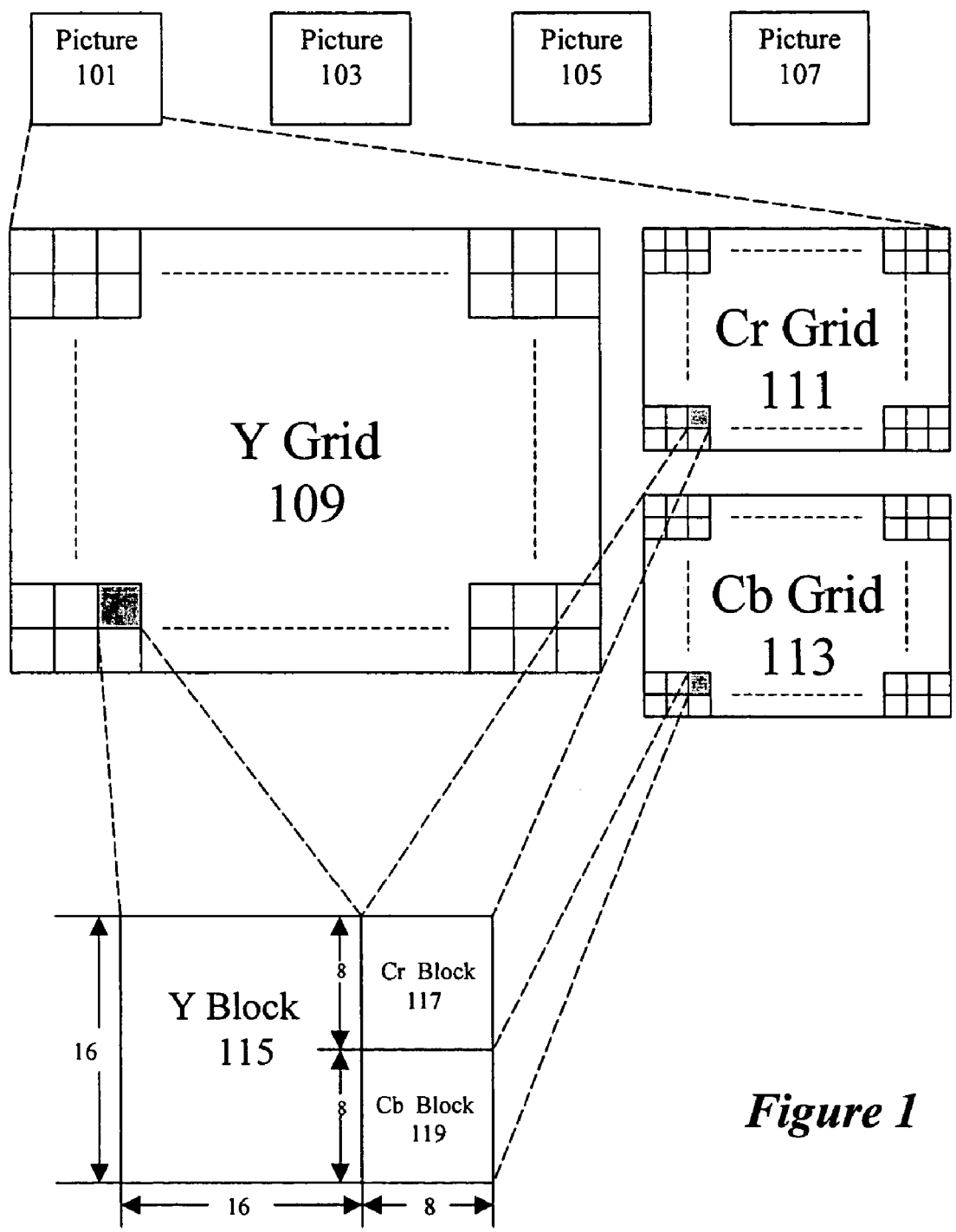
FIG. 1 is a block diagram of an exemplary picture in the H.264 coding standard in accordance with an embodiment of the present invention.

In FIG. 1 there is illustrated a block diagram of an exemplary picture 101. The picture 101 along with successive pictures 103, 105, and 107 form a video sequence. The picture 101 comprises two-dimensional grid(s) of pixels. For color video, each color component is associated with a unique two-dimensional grid of pixels. For example, a picture can include luma, chroma red, and chroma blue components. Accordingly, these components are associated with a luma grid 109, a chroma red grid 111, and a chroma blue grid 113. When the grids 109, 111, 113 are overlaid on a display device, the result is a picture of the field of view at the duration that the picture was captured.

Generally, the human eye is more perceptive to the luma characteristics of video, compared to the chroma red and chroma blue characteristics. Accordingly, there are more pixels in the luma grid 109 compared to the chroma red grid 111 and the chroma blue grid 113. In the H.264 standard, the chroma red grid 111 and the chroma blue grid 113 have half as many pixels as the luma grid 109 in each direction. Therefore, the chroma red grid 111 and the chroma blue grid 113 each have one quarter as many total pixels as the luma grid 109.

The luma grid 109 can be divided into 16×16 pixel blocks. For a luma block 115, there is a corresponding 8×8 chroma red block 117 in the chroma red grid 111 and a corresponding 8×8 chroma blue block 119 in the chroma blue grid 113. Blocks 115, 117, and 119 are collectively known as a macroblock that can be part of a slice group. Currently, sub-sampling is the only color space used in the H.264 specification. This means, a macroblock consist of a 16×16 luminance block 115 and two (sub-sampled) 8×8 chrominance blocks 117 and 118.

Figure 2:
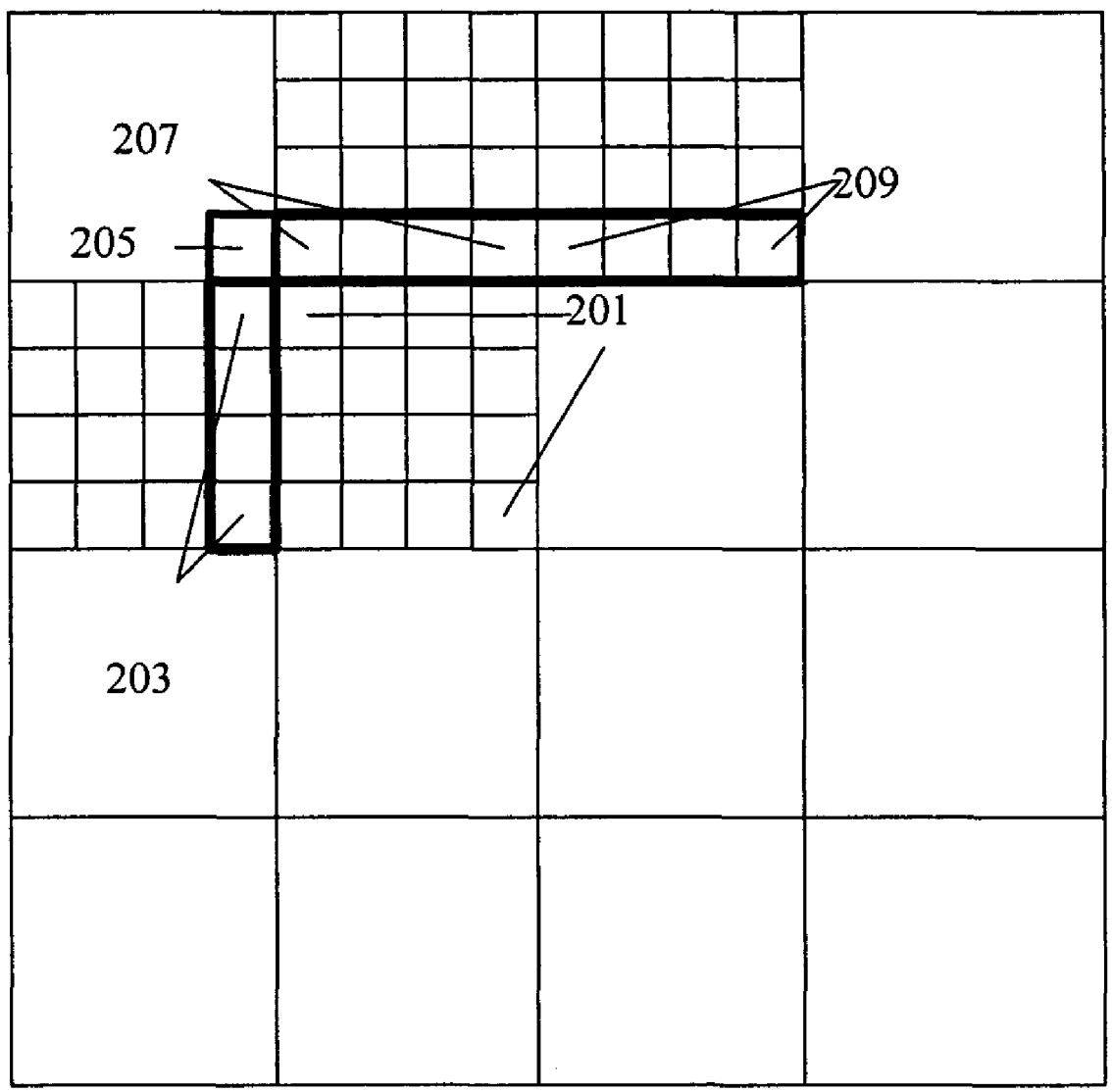
FIG. 2 is a block diagram describing spatially encoded macroblocks in accordance with an embodiment of the present invention.

Referring now to FIG. 2, there is illustrated a block diagram describing spatially encoded macroblocks. Spatial prediction, also referred to as intra-prediction, involves prediction of picture pixels from neighboring pixels. The pixels of a macroblock can be predicted, in a 16×16 mode, an 8×8 mode, or a 4×4 mode. A macroblock is encoded as the combination of the prediction errors representing its partitions.

In the 4×4 mode, a macroblock 201 is divided into 4×4 partitions. The 4×4 partitions of the macroblock 201 are predicted from a combination of left edge partitions 203, a corner partition 205, top edge partitions 207, and top right partitions 209. The difference between the macroblock 201 and prediction pixels from the partitions 203, 205, 207, and 209 is known as the prediction error. The prediction error is encoded along with an identification of the prediction pixels and prediction mode.

Figure 3:
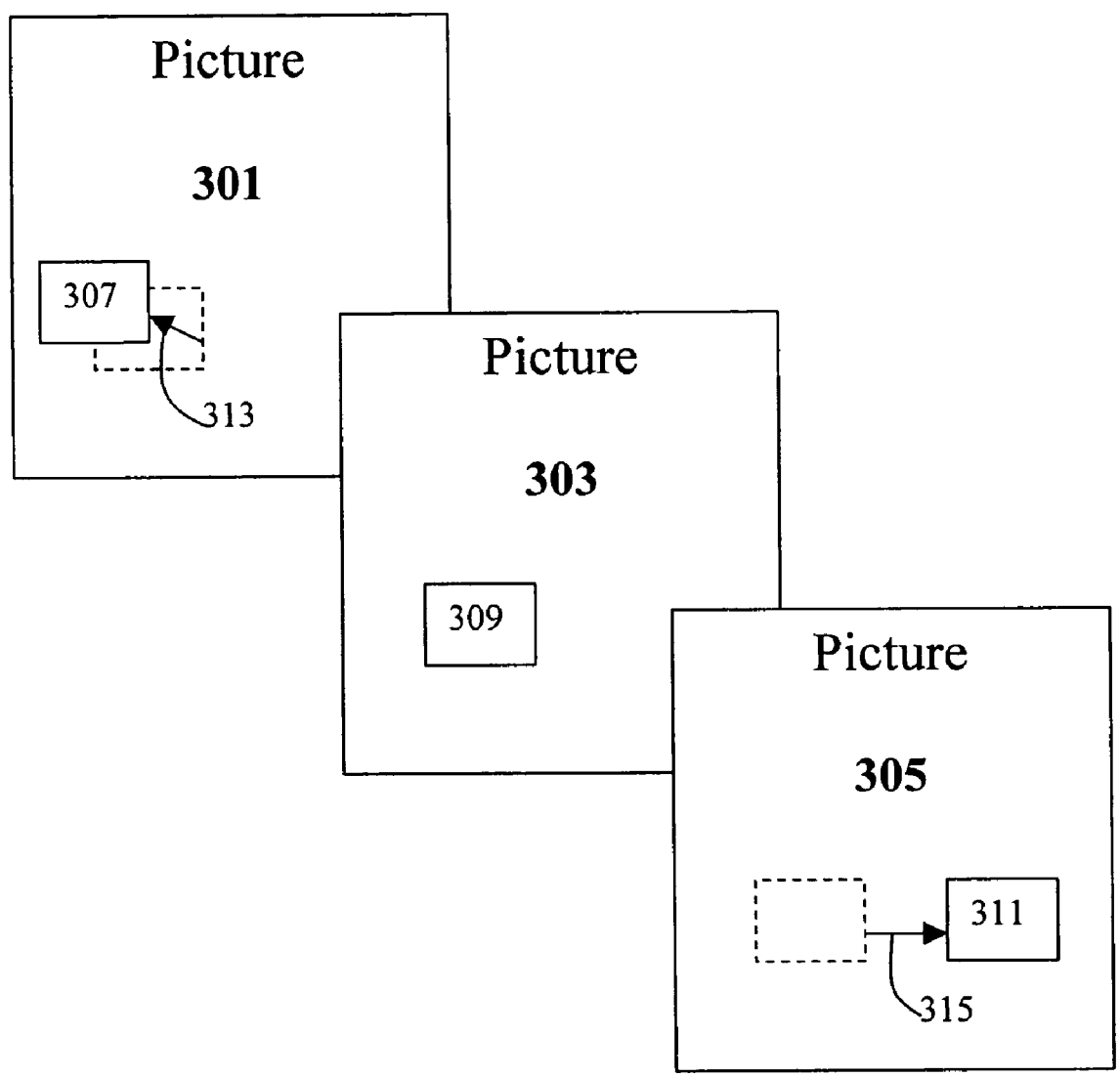
FIG. 3 is a block diagram describing temporally encoded macroblocks in accordance with an embodiment of the present invention.

Referring now to FIG. 3, there is illustrated a block diagram describing temporally encoded partitions. In bidirectional coding, a current partition 309 in the current picture 303 is predicted from a reference partition 307 in a previous picture 301 and a reference partition 311 in a latter arriving picture 305. Accordingly, a prediction error is calculated as the difference between the weighted average of the reference partitions 307 and 311 and the current partition 309. The prediction error and an identification of the prediction partitions are encoded. Motion vectors 313 and 315 identify the prediction partitions.

The weights can also be encoded explicitly, or implied from an identification of the picture containing the prediction partitions. The weights can be implied from the distance between the pictures containing the prediction partitions and the picture containing the partition.

Figure 4:
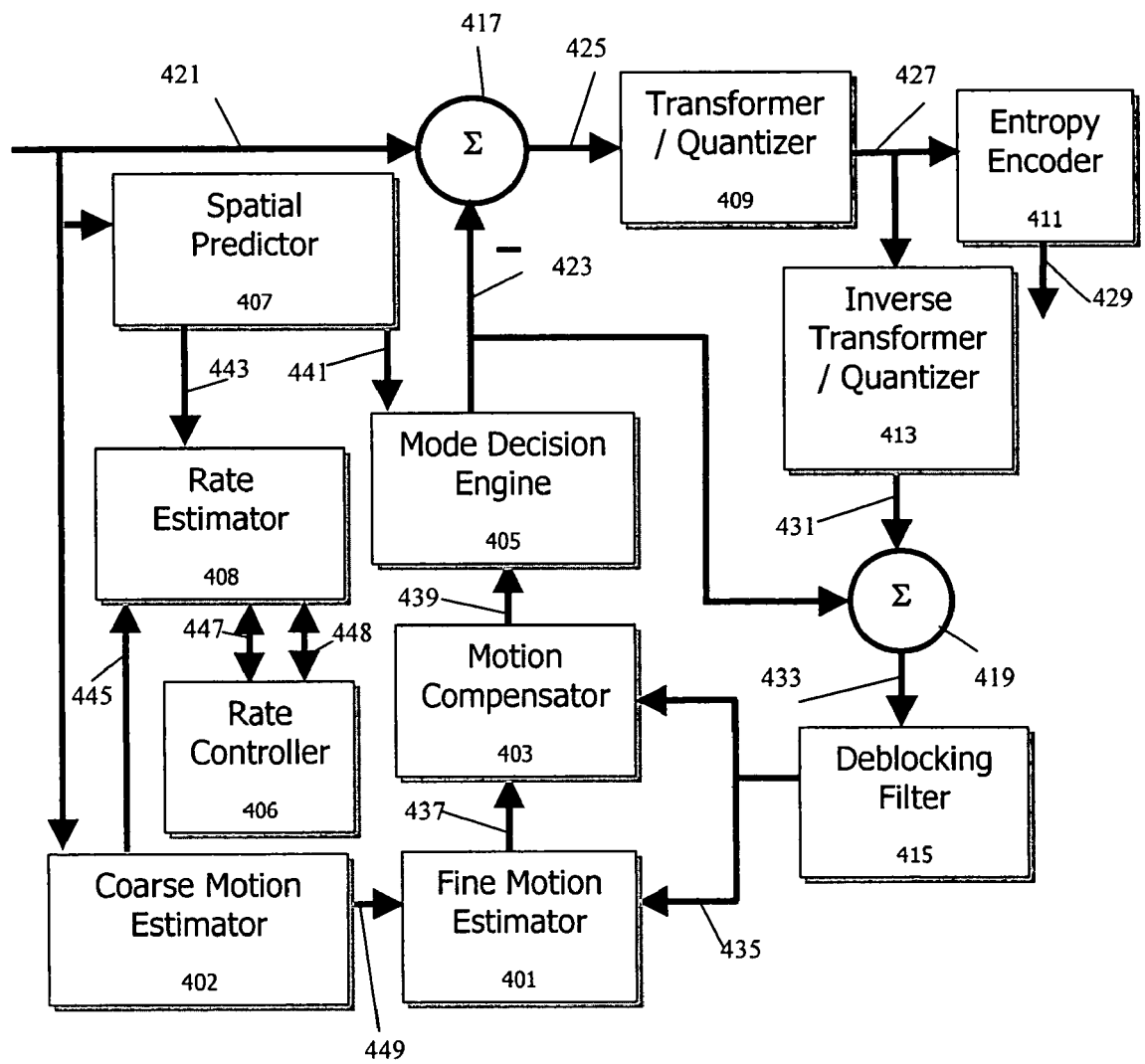
FIG. 4 is a block diagram of an exemplary video encoding system in accordance with an embodiment of the present invention.

Referring now to FIG. 4, there is illustrated a block diagram of an exemplary video encoder 400 in accordance with an embodiment of the present invention. The video encoder 400 comprises a fine motion estimator 401, a coarse motion estimator 402, a motion compensator 403, a mode decision engine 405, a rate controller 406, a spatial predictor 407, a rate estimator 408, a transformer/quantizer 409, an entropy encoder 411, an inverse transformer/quantizer 413, and a deblocking filter 415.

The spatial predictor 407 uses the contents of a current picture 421 for prediction. The spatial predictor 407 receives the current picture 421 and can produce a spatial prediction 441 predicted from previously encoded partitions in the current picture for each partition of the current picture 421 and produce an estimation metric 443 computed from the original partitions in the current picture for each partition of the current picture 421.

Spatially predicted partitions are intra-coded. Luma macroblocks can be divided into 4×4 or 16×16 partitions and chroma macroblocks can be divided into 8×8 partitions. 16×16 and 8×8 partitions each have 4 possible prediction modes, and 4×4 partitions have 9 possible prediction modes.

In the coarse motion estimator 402, the partitions in the current picture 421 are estimated from other original pictures. The other original pictures may be temporally located before or after the current picture 421, and the other original pictures may be adjacent to the current picture 421 or more than a picture away from the current picture 421. To predict a target search area, the coarse motion estimator 402 can compare large partitions that have been subsampled. The coarse motion estimator 402 will output an estimation metric 445 and a motion vector 449 for each partition searched.

The fine motion estimator 401 predicts the partitions in the current picture 421 from reference partitions 435 using a set of motion vectors 449 to predict a target search area. A temporally encoded macroblock can be divided into 16×8, 8×16, 8×8, 4×8, 8×4, or 4×4 partitions. Each partition of a 16×16 macroblock is compared to one or more prediction blocks in previously encoded picture 435 that may be temporally located before or after the current picture 421.

The fine motion estimator 401 improves the accuracy of the coarse motion vectors 449 by searching partitions of variable size that have not been sub-sampled. The fine motion estimator 401 can also use reconstructed reference pictures 435 for prediction. Interpolation can be used to increase accuracy of a set of fine motion vectors 437 to a quarter of a sample distance. The prediction values at half-sample positions can be obtained by applying a 6-tap FIR filter or a bilinear interpolator, and prediction values at quarter-sample positions can be generated by averaging samples at the integer- and half-sample positions. In cases where the motion vector points to an integer-sample position, no interpolation is required.

The motion compensator 403 receives the motion vectors 437 and generates a temporal prediction 439. Motion compensation runs along with the main encoding loop to allow intra-prediction macroblock pipelining.

The estimation metrics 443 and 445 are used to enable the generation of rate control metrics 447 and 448. These rate control metrics 447 and 448 are communicated between the rate estimator 408 and the rate controller 406. A more detailed discussion of the rate estimator 408 will be given in reference to FIGS. 5A and 5B.

The mode decision engine 405 will receive the spatial prediction 441 and temporal prediction 439 and select the prediction mode according to a sum of absolute transformed difference (SATD) cost that optimizes rate and distortion. A selected prediction 423 is output.

Once the mode is selected, a corresponding prediction error 425 is the difference 417 between the current picture 421 and the selected prediction 423. The transformer/quantizer 409 transforms the prediction error and produces quantized transform coefficients 427. In H.264, there are 52 quantization parameters.

Transformation in H.264 utilizes Adaptive Block-size Transforms (ABT). The block size used for transform coding of the prediction error 425 corresponds to the block size used for prediction. The prediction error is transformed independently of the block mode by means of a low-complexity 4×4 matrix that together with an appropriate scaling in the quantization stage approximates the 4×4 Discrete Cosine Transform (DCT). The Transform is applied in both horizontal and vertical directions. When a macroblock is encoded as intra 16×16, the DC coefficients of all 16 4×4 blocks are further transformed with a 4×4 Hardamard Transform.

H.264 specifies two types of entropy coding: Context-based Adaptive Binary Arithmetic Coding (CABAC) and Context-based Adaptive Variable-Length Coding (CAVLC). The entropy encoder 411 receives the quantized transform coefficients 427 and produces a video output 429. In the case of temporal prediction, a set of picture reference indices may be entropy encoded as well.

The quantized transform coefficients 427 are also fed into an inverse transformer/quantizer 413 to produce a regenerated error 431. The original prediction 423 and the regenerated error 431 are summed 419 to regenerate a reference picture 433 that is passed through the deblocking filter 415 and used for motion estimation.

Figure 5A:
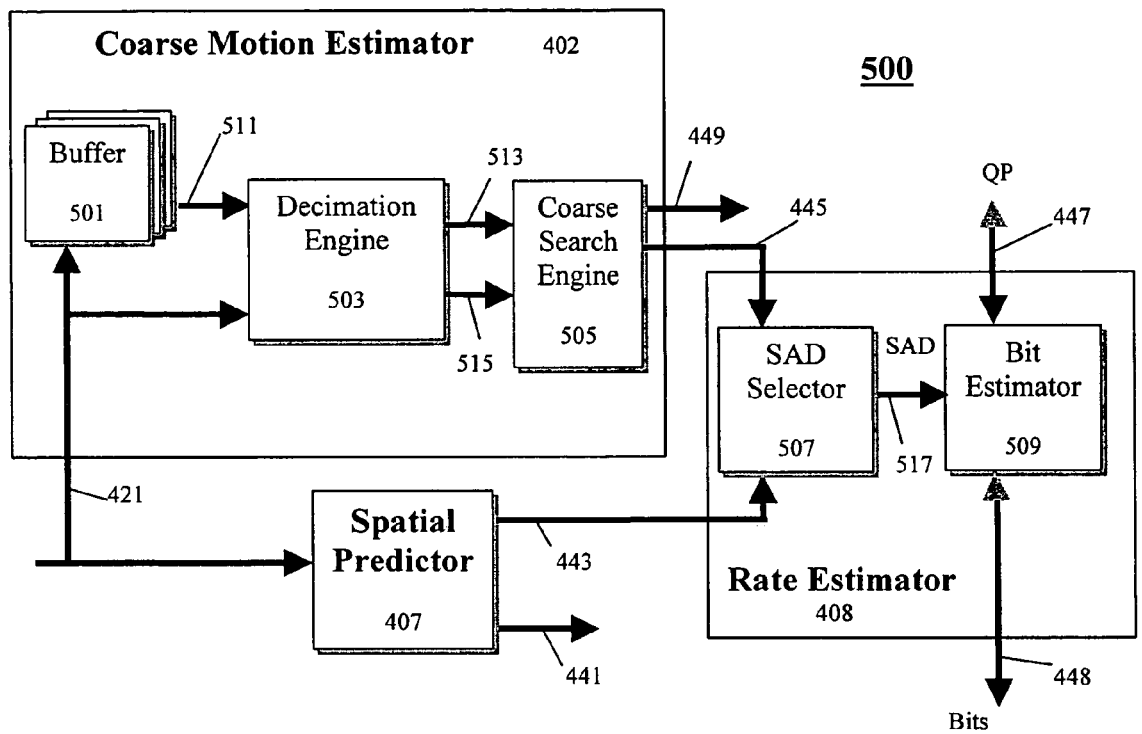
FIG. 5A is a block diagram of an exemplary system with a rate estimator in accordance with an embodiment of the present invention.

Referring now to FIG. 5A, a block diagram of an exemplary system 500 with a rate estimator 408 is shown. The system 500 comprises a coarse motion estimator 402, a spatial predictor 407, and the rate estimator 408.

The coarse motion estimator 402 further comprises a buffer 501, a decimation engine 503, and a coarse search engine 505.

The coarse motion estimator 402 can store one or more original pictures 421 in a buffer 501. By using original pictures 511 as a reference, the coarse motion estimator 402 can allow picture level pipelining. The coarse motion estimator 402 can run ahead of fine motion estimation and other encoding blocks in the video encoder since it uses original pictures 511.

The decimation engine 503 receives the current picture 421 and one or more buffered original pictures 511. The decimation engine 503 produces a sub-sampled current picture 515 and one or more sub-sampled original reference pictures 513. The decimation engine 503 can sub-sample frames using a 2×2 pixel average. Typically, the coarse motion estimator 402 operates on macroblocks of size 16×16. After sub-sampling, the size is 8×8 for the luma grid and 4×4 for the chroma grids. For H.264, fields of size 16×8 can be sub-sampled in the horizontal direction, so a 16×8 field partition could be evaluated as size 8×8.

The coarse motion estimator 402 search can be exhaustive. The coarse search engine 505 determines a cost 445 for motion vectors 449 that describe the displacement from a section of a sub-sampled buffered picture 513 to a partition in the sub-sampled current picture 515. For each search position in the sub-sampled buffered picture 513, an estimation metric or cost 445 can be calculated. The cost 445 can be based on a sum of absolute difference (SAD). One motion vector 449 for every partition is selected and used for fine motion estimation. The selection is based on cost.

Coarse motion estimation can be limited to the search of large partitions (e.g. 16×16 or 16×8) to reduce the occurrence of spurious motion vectors that arise from an exhaustive search of small block sizes.

The spatial predictor 407 was described in reference to FIG. 2 and FIG. 4. The spatial predictor 407 receives the current picture 421 and generates a prediction 441 and a set of SAD values 443 that correspond to partitions of the current picture 421. By using the original partitions from the current picture to generate SAD values 443, this part of the spatial predictor can run ahead of the actual encoding which will later generate the prediction 441 from previously encoded partitions in the current picture.

Prior to encoding, the rate estimator 408 estimates the number of bits 448 required by each macroblock (MB) in the current picture by using both SAD 517 and a quantization parameter (QP). The rate estimator 408 can be used to estimate the relative picture complexity during pre-encoding with a nominal QP value 447 that is supplied by rate control. The resulting coded picture bit estimate 448 on future frames to be coded can be used as an input to rate control to provide "look ahead" functionality for better overall bit-allocation in a sequence. The rate estimator 408 can be run well in advance of coding since metrics are computed on data from the original uncoded input frames.

The macroblock SAD measurement 517 selected the SAD selector 507 and used by the bit estimator 509 is the difference between the original macroblock and either the intra-frame prediction or the inter-frame prediction from the original pictures. The bit estimate corresponds to the number of bits required to code this difference, which is a residual error.

The total number of overhead bits required for a particular mode of encoding can also be a part of the bit estimate. For temporal coding, the overhead can include the bits to code the macroblock mode decision and motion vector. For spatial prediction, the overhead can include the bits to code the spatial prediction mode. Spatial prediction in H.264 has 9 possible modes.

The QP/bit relationship for each encoding mode can be stored in a table of 52 rows. Each row can correspond to a different QP. The bit estimate can be based on a nominal SAD. The number of bits per macroblock can be based on the SAD multiplied by the table value.

Figure 5B:
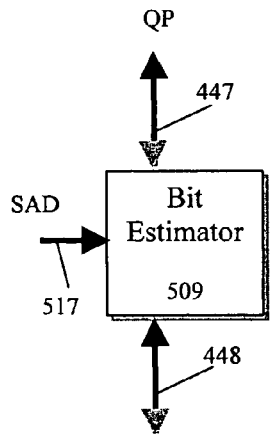
FIG. 5B is a block diagram of an alternative configuration of a rate estimator in accordance with an embodiment of the present invention.

In FIG. 5B, an alternate use of the bit estimator 509 is illustrated. The nominal QP value 447 is estimated based on SAD 517 and the relative picture complexity supplied by rate control. The relative picture complexity can be the number of bits 448 to code a future frame. The QP can be based on a ratio of the table value to the SAD value.

Figure 6:
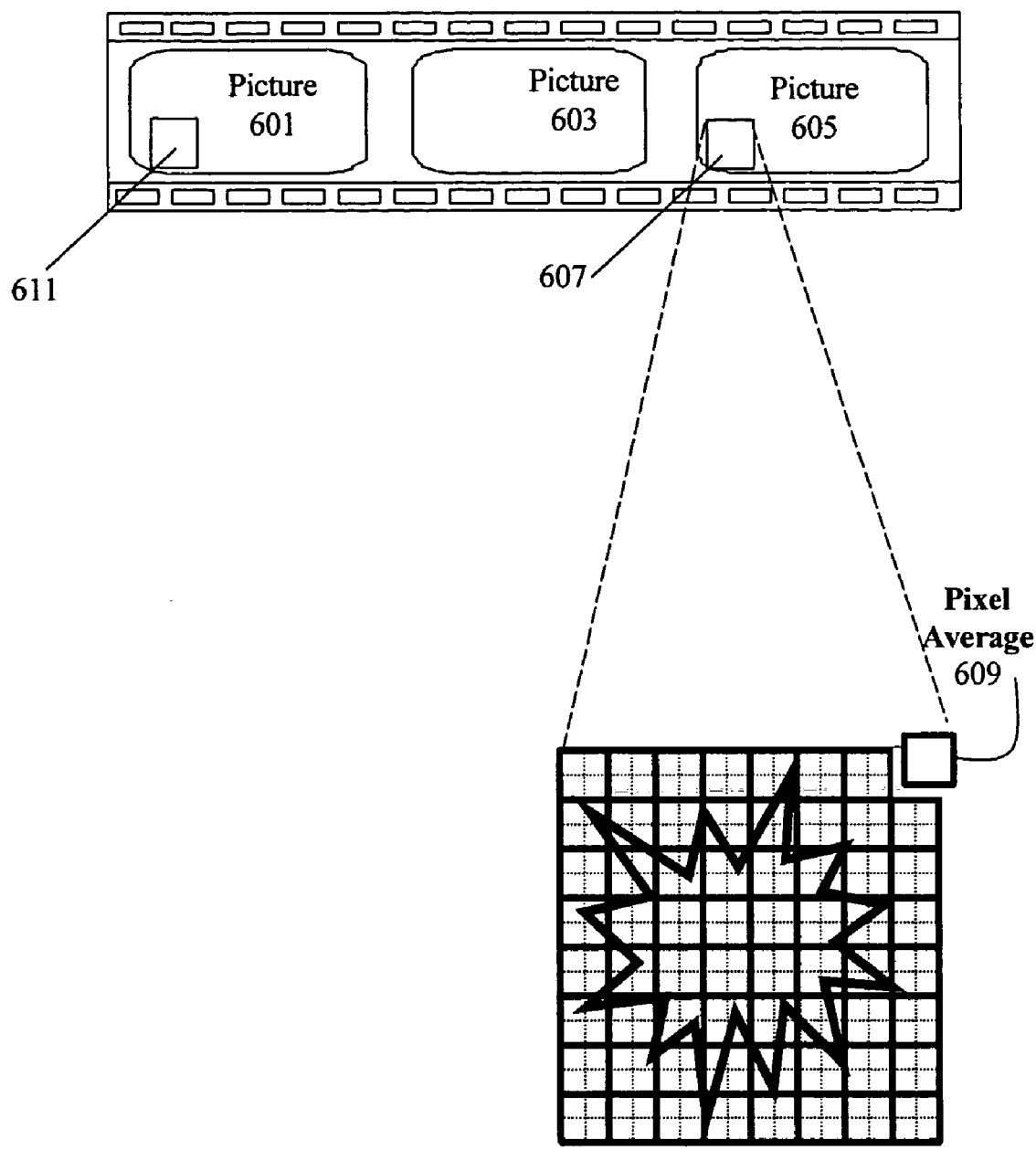
FIG. 6 is a diagram of a sequence of pictures in accordance with an embodiment of the present invention.

Refer now to FIG. 6, which is a block diagram of a sequence of pictures. Three pictures 601, 603, and 605 are shown. A coarse motion estimator can decimate a partition 607 of a current picture 605 and a portion 611 of a previously received picture 601 that will be used as a reference region. An element of the sub-sampled partition 607 is a pixel average 609. A coarse search engine evaluates a correlation between the sub-sampled partition 607 and the reference region 611.

Figure 7:
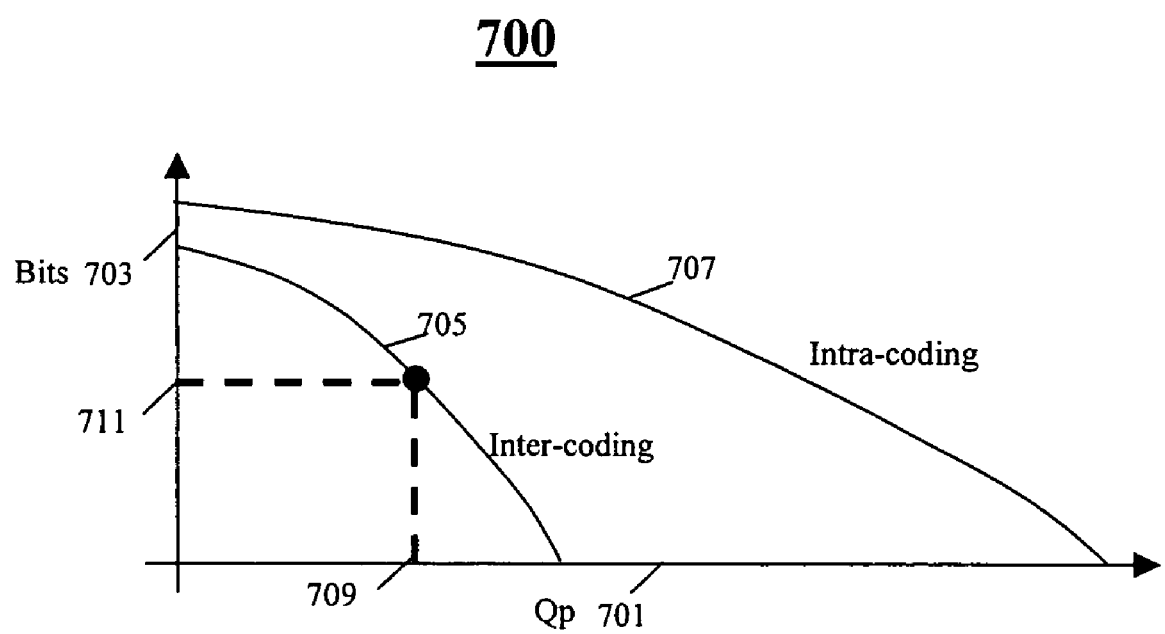
FIG. 7 is a graph depicting an exemplary relation ship between quantization parameter and bit estimate in accordance with an embodiment of the present invention.

FIG. 7 is a graph 700 depicting an exemplary correlation between metrics used for rate estimation in accordance with an embodiment of the present invention. For a reference SAD value, an example correlation between quantization parameter (QP) 701 and bits 703 is shown. In general, intra-coding 707 can require more bits than inter-coding 707. As the quantization parameter (QP) 701 increases, the step size also increases. Therefore, the number of bits 703 required to code a picture will decrease.

An example relationship between a particular quantization parameter 709 and number of bits 711 is shown. Given one metric, the other is determined from this one-to-one correspondence. This relationship for a series of quantization parameters and bit estimates can be stored in a memory of an integrated circuit. Different encoding modes (e.g. intra-coding and inter-coding) can have separate entries in a look-up table.

Figure 8:
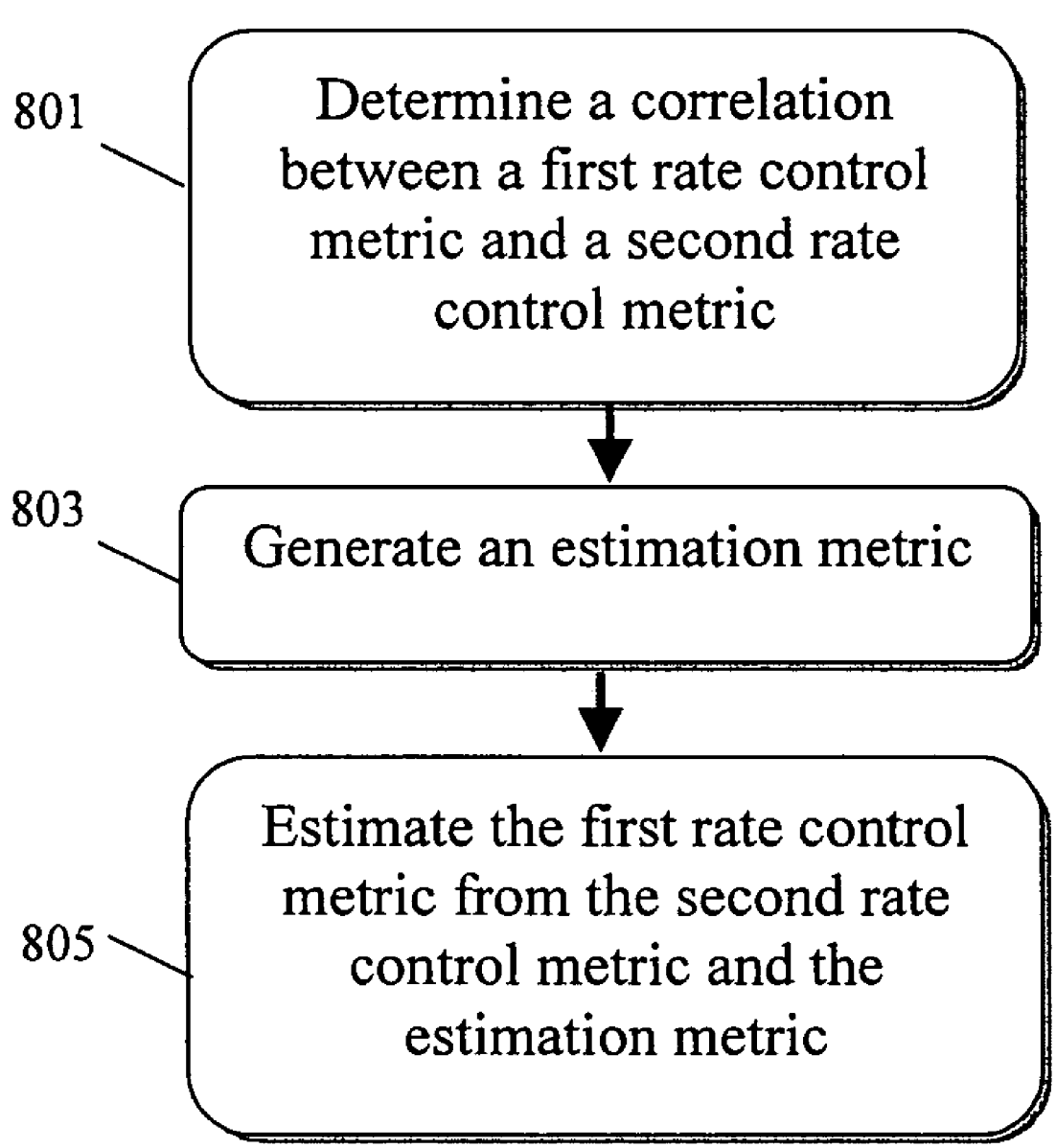
FIG. 8 is a flow diagram of an exemplary method for rate estimation in accordance with an embodiment of the present invention.

FIG. 8 is a flow diagram 800 of an exemplary method for rate estimation in accordance with an embodiment of the present invention. Determine a correlation between a first rate control metric and a second rate control metric at 801. Examples of rate control metrics include the estimated number of bits to code a macroblock and the quantization parameter used to code the macroblock. The correlation between rate control metrics can be determined theoretically or empirically. The correlation can be expressed as an equation or stored in a look-up table.

Generate an estimation metric at 803. The estimation metric can be a sum of absolute difference between a current picture partition and a reference picture portion. Video encoding can use spatial prediction and motion estimation. The reference picture portion in the case of motion estimation is part of other original pictures as used with the coarse motion estimator. The reference picture portion in the case of spatial prediction is generated from part of the current original picture.

Estimate the first rate control metric from the second rate control metric and the estimation metric at 805. The number of bits to code a macroblock can be determined from the SAD and the quantization parameter. Alternatively, the quantization parameter can be determined from the SAD and the number of bits to code a macroblock.

The embodiments described herein may be implemented as a board level product, as a single chip, application specific integrated circuit (ASIC), or with varying levels of a video classification circuit integrated with other portions of the system as separate components. An integrated circuit may store a supplemental unit in memory and use an arithmetic logic to encode, detect, and format the video output.

The degree of integration of the video classification circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on one encoding standard, the invention can be applied to a wide variety of standards.

Therefore, it is intended that the present invention not be limited to the particular embodiment disclosed, but that the present invention will include all embodiments falling within the scope of the appended claims.

The invention claimed is:

1. A method for rate estimation in a video encoder in a circuit, said method comprising:
    determining a correlation between a first rate control metric and a second rate control metric in said circuit;
    generating an estimation metric; and
    estimating the first rate control metric from the second rate control metric and the estimation metric;
    wherein determining, generating, and estimating occur while predicting a partition of a picture from an original another picture, wherein predicting is limited to integer offsets;
    executing a first plurality of instructions stored in a non-transitory computer-readable medium for predicting the partition from the another picture, wherein predicting further comprises interpolating fractional sample resolutions, thereby resulting in a prediction error; and
    executing a second plurality of instructions stored in a non-transitory computer-readable medium for quantizing the prediction error based at least in part on the first rate control metric.

2. The method of claim 1, wherein the first rate control metric is an estimated amount of data for encoding a macroblock and the second rate control metric is a quantization parameter.

3. The method of claim 1, wherein the first rate control metric is a quantization parameter and the second rate control metric is an estimated amount of data for encoding a macroblock.

4. The method of claim 1, wherein the estimation metric is a sum of absolute difference between a current picture partition and a reference picture portion.

5. The method of claim 1, wherein the estimation metric is based on a spatial prediction.

6. The method of claim 1, wherein the estimation metric is based on a motion prediction.

7. The method of claim 1, wherein the correlation between the first rate control metric and the second rate control metric is stored in a look-up table.

8. The method of claim 1, further comprising:
    predicting the partition from a reconstructed another picture, wherein the reconstructed picture represents the original another picture with lossy coding and decoding, thereby generating a prediction error;
    quantizing the prediction error based at least in part on the first rate control metric.

9. A system for rate estimation in a video encoder, said system comprising:
    a first plurality of instructions for correlating a first rate control metric and a second rate control metric;
    a second plurality of instructions for generating an estimation metric; and
    a third plurality of instructions for estimating the first rate control metric from the second rate control metric and the estimation metric;
    wherein correlating, generating, and estimating occur while predicting a partition from a picture from another picture, wherein predicting is limited to integer offsets;
    a fourth plurality of instructions for predicting the partition from the another picture, wherein predicting further comprises interpolating fractional sample resolutions, thereby resulting in a prediction error; and
    a fifth plurality of instructions for quantizing the prediction error based at least in part on the first rate control metric.

10. The system of claim 9, wherein the first rate control metric is a number of bits to code a macroblock and the second rate control metric is a quantization parameter.

11. The system of claim 9, wherein the first rate control metric is a quantization parameter and the second rate control metric is a number of bits to code a macroblock.

12. The system of claim 9, wherein the estimation metric is a sum of absolute difference between a current picture portion and a reference picture portion.

13. The system of claim 9, wherein the picture estimator further comprises: a spatial estimator for generating a spatial estimation metric; a motion estimator for generating a motion estimation metric; and a selector for selecting the estimation metric from the spatial estimation metric and the motion estimation metric.

14. The system of claim 9, wherein the metric engine comprises a look-up table.

15. A system comprising:
an integrated circuit comprising:
    a first circuit for determining a correlation between a first rate control metric and a second rate control metric;
    a second circuit for generating an estimation metric; and
    a third circuit for estimating the first rate control metric from the second rate control metric and the estimation metric;
    wherein determining, generating, and estimating occur while predicting a partition of a picture from an original another picture, wherein predicting is limited to integer offsets; and
    a fourth circuit for predicting the partition from a reconstructed another picture, wherein the reconstructed picture represents the original another picture with lossy coding and decoding, wherein predicting further comprises interpolating fractional sample resolutions, thereby resulting in a prediction error; and
    a fifth circuit for quantizing the prediction error based at least in part on the first rate control metric.

16. The system of claim 15, wherein the first rate control metric is a number of bits to code a macroblock and the second rate control metric is a quantization parameter.

17. The system of claim 15, wherein the first rate control metric is a quantization parameter and the second rate control metric is a number of bits to code a macroblock.

18. The system of claim 15, wherein the estimation metric is a sum of absolute difference between a current picture portion and a reference picture portion.

19. The system of claim 15, wherein the estimation metric is based on a spatial prediction.

20. The system of claim 15, wherein the estimation metric is based on a motion prediction.

21. The system of claim 15, wherein the correlation between the first rate control metric and the second rate control metric is stored in a memory.

22. A system comprising:
an integrated circuit comprising:
    a first circuit for determining a correlation between a first rate control metric and a second rate control metric;
    a second circuit for generating an estimation metric; and
    a third circuit for estimating the first rate control metric from the second rate control metric and the estimation metric;
    wherein correlating, generating, and estimating occur while predicting a partition from a picture from another picture, wherein predicting is limited to integer offsets;
a non-transitory computer-readable medium storing:
    a first plurality of instructions for predicting the partition from the another picture, wherein predicting further comprises interpolating fractional sample resolutions, thereby resulting in a prediction error; and
    a second plurality of instructions for quantizing the prediction error based at least in part on the first rate control metric.

23. The system of claim 22, wherein the first rate control metric is a number of bits to code a macroblock and the second rate control metric is a quantization parameter.

24. The system of claim 22, wherein the first rate control metric is a quantization parameter and the second rate control metric is a number of bits to code a macroblock.

25. The system of claim 22, wherein the estimation metric is a sum of absolute difference between a current picture portion and a reference picture portion.

26. The system of claim 22, wherein the estimation metric is based on a spatial prediction.

27. The system of claim 22, wherein the estimation metric is based on a motion prediction.

28. The system of claim 22, wherein the correlation between the first rate control metric and the second rate control metric is stored in a memory.

* * * * *